United States Patent
Gan

(10) Patent No.: US 9,841,651 B2
(45) Date of Patent: Dec. 12, 2017

(54) ARRAY SUBSTRATE AND LIQUID CRYSTAL PANELS

(71) Applicant: Shenzhen China Star Optoelectronics Technology Co., Ltd., Shenzhen, Guangdong (CN)

(72) Inventor: Qiming Gan, Guangdong (CN)

(73) Assignee: Shenzhen China Star Optoelectronics Technology Co., Ltd., Shenzhen, Guangdong (CN)

( * ) Notice: Subject to any disclaimer, the term of this patent is extended or adjusted under 35 U.S.C. 154(b) by 269 days.

(21) Appl. No.: 14/784,114

(22) PCT Filed: Sep. 25, 2015

(86) PCT No.: PCT/CN2015/090789
§ 371 (c)(1),
(2) Date: Oct. 13, 2015

(87) PCT Pub. No.: WO2017/045224
PCT Pub. Date: Mar. 23, 2017

(65) Prior Publication Data
US 2017/0153520 A1    Jun. 1, 2017

(51) Int. Cl.
G02F 1/1343 (2006.01)
G02F 1/1362 (2006.01)
G02F 1/1368 (2006.01)
G02F 1/1333 (2006.01)
G02F 1/1335 (2006.01)

(52) U.S. Cl.
CPC ...... *G02F 1/136227* (2013.01); *G02F 1/1368* (2013.01); *G02F 1/13439* (2013.01); *G02F 1/133345* (2013.01); *G02F 1/133514* (2013.01); *G02F 1/134309* (2013.01); *G02F 2001/133302* (2013.01); *G02F 2001/134345* (2013.01); *G02F 2201/123* (2013.01)

(58) Field of Classification Search
CPC .......................................... G02F 2001/134345
USPC .......................................................... 349/143
See application file for complete search history.

(56) References Cited

U.S. PATENT DOCUMENTS

2001/0004274 A1    6/2001  Sakamoto
2017/0153520 A1*   6/2017  Gan .................. G02F 1/136227

FOREIGN PATENT DOCUMENTS

| CN | 104503155 A | 4/2015 |
|---|---|---|
| CN | 104698697 A | 6/2015 |
| JP | 2004302382 A | 10/2004 |

* cited by examiner

*Primary Examiner* — Phu Vu
(74) *Attorney, Agent, or Firm* — Andrew C. Cheng

(57) ABSTRACT

The array substrate includes a plurality of pixel structures, each of the pixel structure comprising thin film transistor (TFTs) and a pixel electrodes on a glass substrate. A passivation layer is arranged between the TFT and the pixel electrode. The pixel electrode electrically connects to the TFT via a through hole of the passivation layer. The passivation layer includes a groove structure having a plurality of recess portions arranged periodically and at least one protrusion portion between every two adjacent recess portions. The passivation layer includes a second groove surrounding a rim of the groove structure. The second groove connects the plurality of the recess portions. The pixel electrode is substantially a surface covering the recess portions and the protrusion portions, and edges of the pixel electrode extend into the second groove. In addition, a liquid crystal panel includes the above array substrate is also disclosed.

18 Claims, 4 Drawing Sheets

ARRAY SUBSTRATE AND LIQUID CRYSTAL PANELS

BACKGROUND OF THE INVENTION

1. Field of the Invention

The present disclosure relates to liquid crystal display technology, and more particularly to an array substrate and a liquid crystal panel having the same.

2. Discussion of the Related Art

Liquid crystal display (LCD) are thin display devices, and the liquid crystal panels are the key components of the LCD. The liquid crystal panel usually includes an array substrate, a color filter substrate opposite to the array substrate, and a liquid crystal layer between the array substrate and the color filter substrate.

Currently, vertical alignment (VA) mode LCDs may include the liquid crystal having the characteristic, such as negative dielectric, to form the liquid crystal layer. With respect to the VA mode LCDs, when the voltage is not applied thereto, the liquid crystal molecules are vertical to the arrangement of the conductive glass. However, serious color washout may occur when the viewing angle is large, and this is usually solved by adopting the pixel structure of multi domain.

Referring to FIGS. 1 and 2, the conventional pixel structure includes a passivation layer 1 and a pixel electrode. Specifically, the passivation layer 1 includes a groove structure 3 having a plurality of recess portions 3a and a protrusion portion 3b between two recess portions 3a. The pixel electrode 2 covers on the recess portions 3a and the protrusion portion 3b and is substantially a continuous surface. As shown in FIG. 1, a center of the passivation layer 1 is considered as an original point of a X-axis and a Y-axis for dividing the passivation layer 1 into a first field 1a, a second field 1b, a third field 1c, and a fourth field 1d. The tilting angles of the recess portions 3a and the protrusion portion 3b of the groove structure 3 are different in the first field 1a, the second field 1b, the third field 1c, and the fourth field 1d. Correspondingly, the pixel electrode 2 covering on the recess portions 3a and the base-color sub-pixels includes a plurality of stripe-like electrodes having different tilting angle respectively in the first field 1a, the 11b, the third field 1c, and the fourth field 1d, which contributes to resolve the color shift issue when the viewing angle is large.

However, the shape of the edge portion of the pixel electrode 2 are similar, as shown in FIGS. 3 and 4. That is, regardless along the X-axis or the Y-axis, the edge portions of the pixel electrode 2 are step-like structure. As such, the liquid crystal molecules may align differently. With respect to the liquid crystal panel, the alignment of the liquid crystal molecules begins from the center of the pixel electrode and then the liquid crystal molecules in a rim may tilt. If the liquid crystal molecules are not aligned orderly, the disorder dark-stripe area may occur, and the light transmission rate of the liquid crystal panel may be reduced.

SUMMARY

The array substrate changes the pixel structure of the array substrate such that the alignment of the liquid crystal molecules may be uniform and stable, which enhances the light transmission rate of the liquid crystal panel.

In one aspect, an array substrate includes: a plurality of pixel structures, each of the pixel structure includes thin film transistor (TFTs) and a pixel electrodes on a glass substrate, a passivation layer is arranged between the TFT and the pixel electrode, the pixel electrode electrically connecting to the TFT via a through hole of the passivation layer, the passivation layer includes a groove structure having a plurality of recess portions arranged periodically and at least one protrusion portion between every two adjacent recess portions, the passivation layer includes a second groove surrounding a rim of the groove structure, the second groove connecting the plurality of the recess portions, the pixel electrode is substantially a surface covering the recess portions and the protrusion portions, and edges of the pixel electrode extending into the second groove.

Wherein the through hole is configured at a center of the groove structure.

Wherein the through hole is an original point of a X-axis and a Y-axis for dividing the groove structure into a first field, a second field, a third field, and a fourth field, the protrusion and the recess portions of the groove structure tilt with respect to the X-axis in the first field, the second field, the third field, and the fourth field, the recess portions and the protrusion portion of the first field and the second field are symmetric to the protrusion portion and the recess portions of the third field and the fourth field in view of the X-axis, and the recess portions and the protrusion portion of the first field and the groove structure fourth field are symmetric to the protrusion portion and the recess portions of the second field and the third field in view of the Y-axis.

Wherein the protrusion portion and the recess portions of the first field tilt for 45 degrees with respect to the X-axis, the protrusion portion and the recess portions of the second field tilt for 135 degrees with respect to the X-axis, the protrusion portion and the recess portions of the third field tilt for −135 degrees with respect to the X-axis, and the protrusion portion and the recess portions of the fourth field tilt for −45 degrees with respect to the X-axis.

Wherein a width of the recess portions and the protrusion portion are the same.

Wherein a depth of the recess portions is smaller than the depth of the passivation layer.

Wherein a width of the second groove and the recess portion are the same, and the width of the second groove is larger than the width of the recess portion.

Wherein the pixel electrode is made by ITO.

Wherein the passivation layer is made by $SiN_x$ or $SiO_x$.

In another aspect, a liquid crystal panel includes: an array substrate, a color-filter substrate opposite to the array substrate, and a liquid crystal layer between the array substrate and the color-filter substrate, the array substrate includes a plurality of pixel structures, each of the pixel structure includes thin film transistor (TFTs) and a pixel electrodes on a glass substrate, a passivation layer is arranged between the TFT and the pixel electrode, the pixel electrode electrically connecting to the TFT via a through hole of the passivation layer, the passivation layer includes a groove structure having a plurality of recess portions arranged periodically and at least one protrusion portion between every two adjacent recess portions, the passivation layer includes a second groove surrounding a rim of the groove structure, the second groove connecting the plurality of the recess portions, the pixel electrode is substantially a surface covering the recess portions and the protrusion portions, and edges of the pixel electrode extending into the second groove.

In view of the above, the pixel structure of the array substrate and the liquid crystal panel is enhanced. A second groove is arranged in a rim of the groove structure within the passivation layer. The pixel electrode is substantially a continuous surface covering the groove structure, and edges of the pixel electrode extend toward the second groove.

Regardless the directions along the X-axis or the Y-axis, the edges of the pixel electrode smoothly extend toward the second groove for a specific length. Thus, the alignment of the liquid crystal molecules may not be disorder. As such, the alignment of the liquid crystal molecules of the pixel structure is stable, and thus the light transmission rate of the liquid crystal panel is enhanced.

DETAILED DESCRIPTION OF THE EMBODIMENTS

Figure 1:
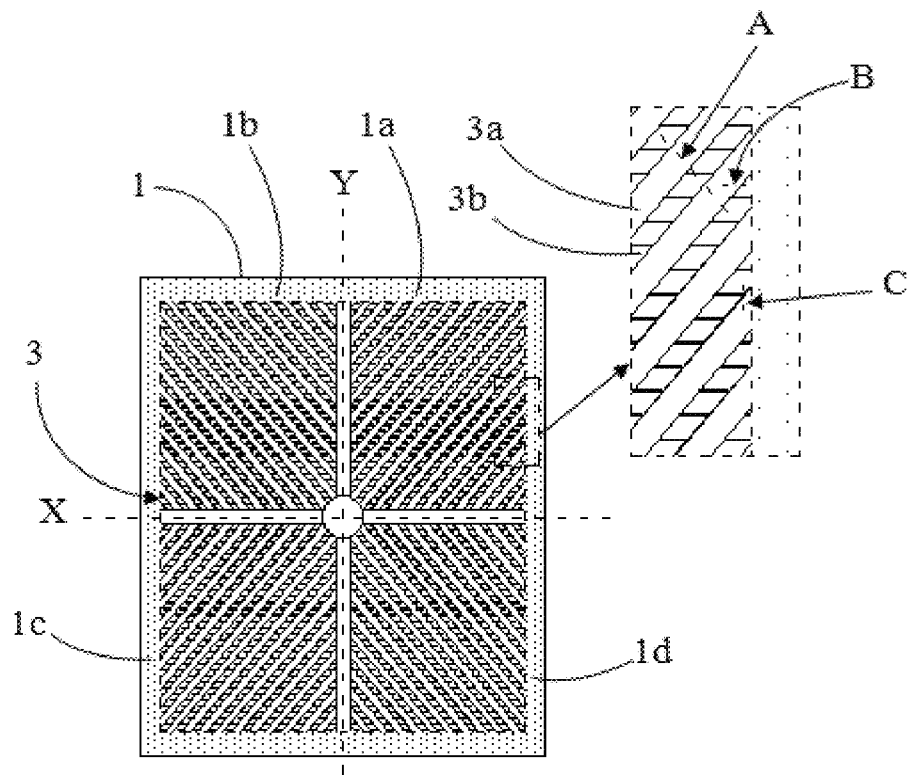
FIG. 1 is a top view of the passivation layer of one conventional pixel structure.
Figure 2:
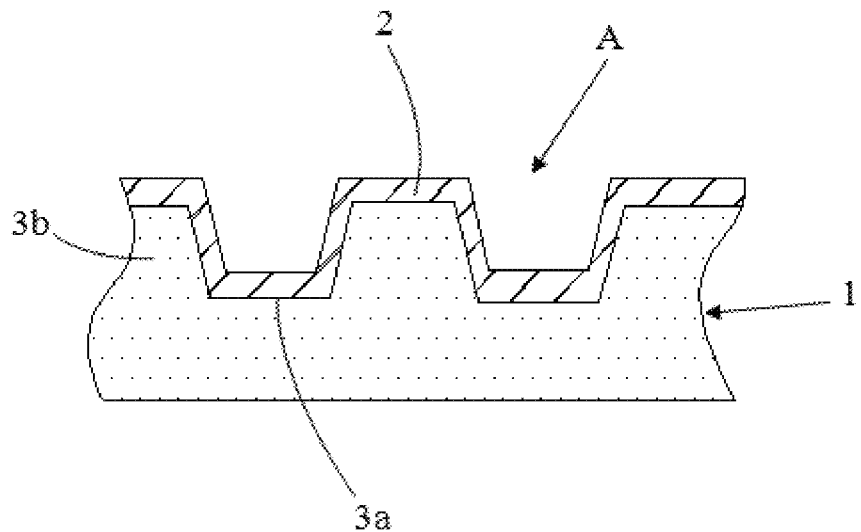
FIG. 2 is a cross-sectional view of the portion "A" of FIG. 1, which also shows the pixel electrode on the passivation layer.
Figure 3:
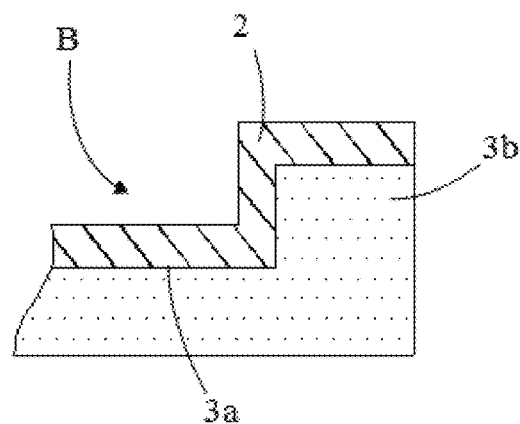
FIG. 3 is a cross-sectional view of the portion "B" of FIG. 1, which also shows the pixel electrode on the passivation layer.
Figure 4:
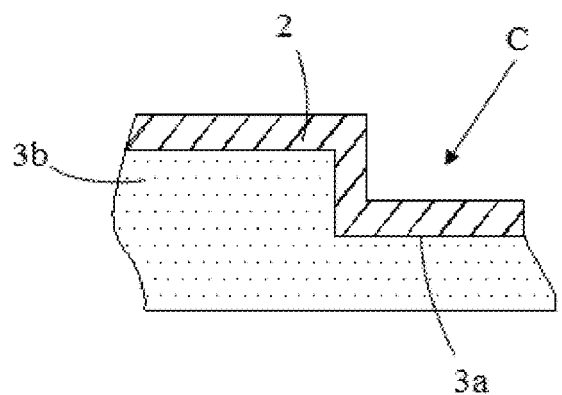
FIG. 4 is a cross-sectional view of the portion "C" of FIG. 1, which also shows the pixel electrode on the passivation layer.

Various example embodiments will now be described more fully with reference to the accompanying drawings in which some example embodiments are shown. In the drawings, the thicknesses of layers and regions may be exaggerated for clarity. In the following description, in order to avoid the known structure and/or function unnecessary detailed description of the concept of the invention result in confusion, well-known structures may be omitted and/or functions described in unnecessary detail.

Figure 5:
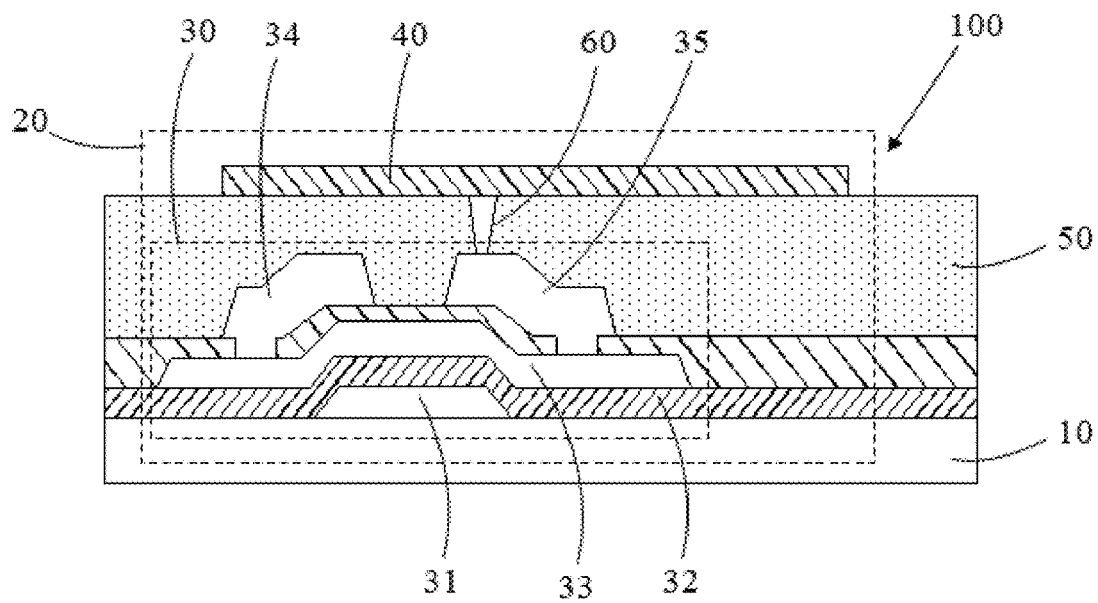
FIG. 5 is a schematic view of the array substrate in accordance with one embodiment.

FIG. 5 is a schematic view of the array substrate in accordance with one embodiment. The array substrate 100 includes a glass substrate 10 and a plurality of pixel structures 20 on the glass substrate 10. It is to be noted that FIG. 5 only shows the partial cross-sectional view of one of the pixel structures 20.

Each of the pixel structures 20 includes at least one thin film transistor (TFT) 30 and at least one pixel electrode 40. The passivation layer 50 is arranged between the TFT 30 and the pixel electrode 40. As shown in FIG. 5, the TFT 30 includes a gate 31, a gate insulation layer 32, an active layer 33, a source 34, and a drain 35. The pixel electrode 40 electrically connects to the drain 35 of the TFT 30 via the through hole 60 of the passivation layer 50. In another example, the pixel electrode 40 electrically connects to the source 34 of the TFT 30 via the through hole 60 of the passivation layer 50. The pixel electrode 40 may be $SiN_x$ or $SiO_x$.

Figure 6:
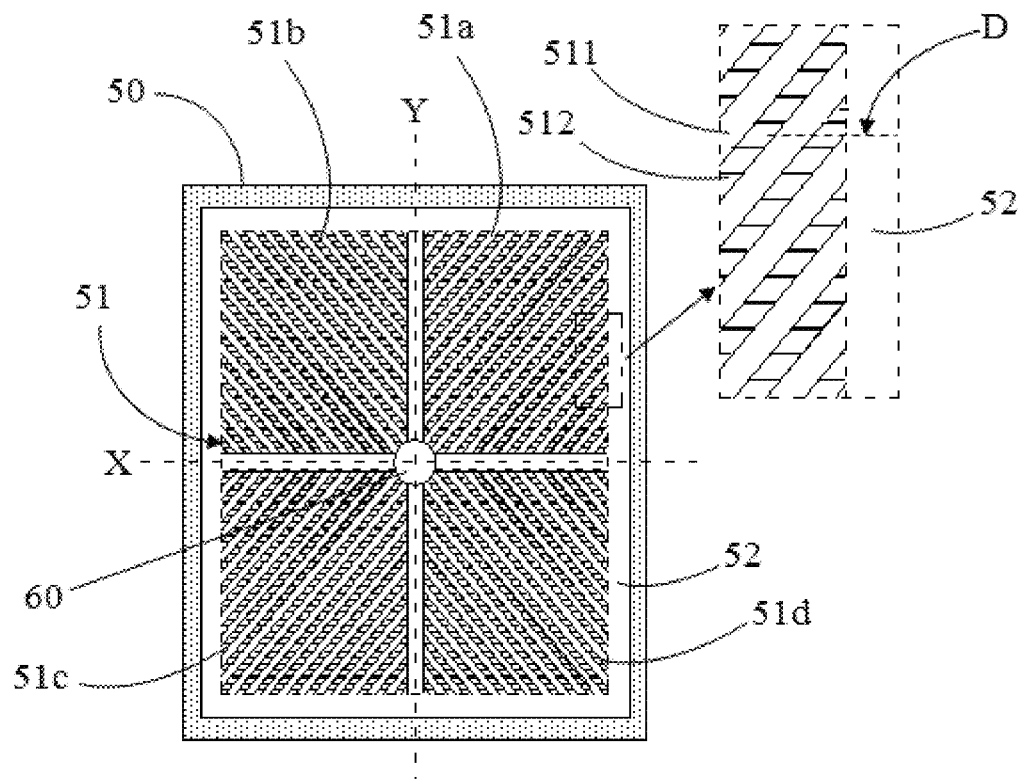
FIG. 6 is a top view of the passivation layer of the pixel structure in accordance with one embodiment.
Figure 7:
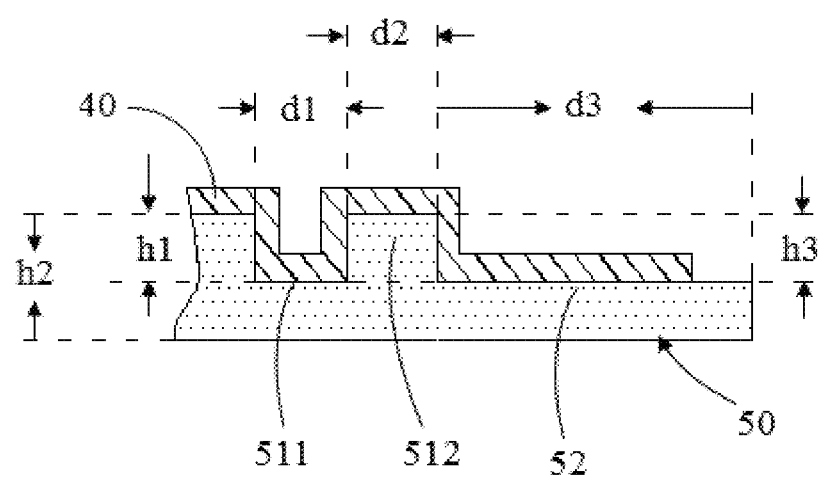
FIG. 7 is a cross-sectional view of the portion "D" of FIG. 6, which also shows the pixel electrode on the passivation layer.
Figure 8:
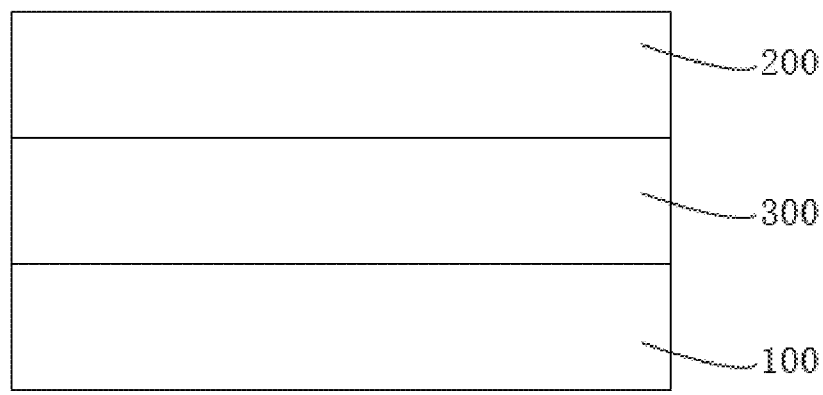
FIG. 8 is a schematic view of the liquid crystal panel in accordance with one embodiment.

Referring to FIGS. 6 and 7, the passivation layer 50 includes a groove structure 51. The groove structure 51 includes a plurality of recess portions 511 arranged periodically and at least one protrusion portion 512 between two adjacent recess portions 511. The passivation layer 50 includes a second groove 52 surrounding a rim of the groove structure 51. The second groove 52 connects the plurality of the recess portions 511. The pixel electrode 40 is substantially a surface covering the recess portions 511 and the protrusion portion 512. In addition, the edges of the pixel electrode 40 extends into the second groove 52. As shown in FIG. 6, the through hole 60 is configured at the center of the groove structure 51. The through hole 60 is considered as an original point of a X-axis and a Y-axis for dividing the groove structure 51 into a first field 51a, a second field 51b, a third field 51c, and a fourth field 51d.

The protrusion portion 512 and the recess portions 511 of the groove structure 51 tilt with respect to the X-axis in the first field 51a, the second field 51b, the third field 51c, and the fourth field 51d. in addition, the recess portions 511 and the protrusion portion 512 of the first field 51a and the second field 51b are symmetric to the protrusion portion 512 and the recess portions 511 of the third field 51c and the fourth field 51d in view of the X-axis. The recess portions 511 and the protrusion portion 512 of the first field 51a and the groove structure fourth field 51d are symmetric to the protrusion portion 512 and the recess portions 511 of the second field 51b and the third field 51c in view of the Y-axis. In one embodiment, the protrusion portion 512 and the recess portions 511 of the first field 51a tilt for 45 degrees with respect to the X-axis. The protrusion portion 512 and the recess portions 511 of the second field 51b tilt for 135 degrees with respect to the X-axis. The protrusion portion 512 and the recess portions 511 of the third field 51c tilt for −135 degrees with respect to the X-axis. The protrusion portion 512 and the recess portions 511 of the fourth field 51d tilt for −45 degrees with respect to the X-axis.

In view of the above pixel structure, the pixel electrode 40 covering the recess portions 511 and the protrusion portion 512 include the stripe-like electrode having different angles in the first field 51a, the second field 51b, the third field 51c, and the fourth field 51d so as to enhance the color shift issue when the viewing angle is large. In addition, the edges of the pixel electrode 40 extends toward the second groove 52. Regardless the directions along the X-axis or the Y-axis, the edges of the pixel electrode 40 smoothly extend toward the second groove 52 for a specific length. Thus, the alignment of the liquid crystal molecules may not be disorder. As such, the alignment of the liquid crystal molecules of the pixel structure is stable, and thus the light transmission rate of the liquid crystal panel is enhanced. The groove structure 51 and the second groove 52 are manufactured by adopting a pattern process via the yellow-light manufacturing process applied to the passivation layer 50. The pixel electrode 40 continuously cover the groove structure 51 and the second groove 52. The yellow-light manufacturing process may be omitted, and the pixel electrode 40 may be deposited directly on the groove structure 51 and the second groove 52 of the passivation layer 50.

In addition, as shown in FIG. 7, a depth of the recess portions 511 within the groove structure 51 ("h1") is smaller than the thickness of the passivation layer 50 ("h2"). The depth of the recess portions 511 ("h1") may be variable, and may be configured in accordance with the thickness of the passivation layer 50 ("h2") or other design requirement. The width of the recess portions 511 ("d1") and the width of the protrusion portion 512 ("d2") may be variable, and may be configured in accordance with the design requirement. In the embodiment, d1=d2. In addition, the depth of the second groove 52 ("h3") is smaller than the thickness of the passivation layer 50 ("h2"). The depth of the second groove 52 ("h3") may be larger than or smaller than the depth of the recess portions 511 ("h1"), and may be configured according to the design requirement. In an example, h3=h1. The width of the second groove 52 ("d3") is larger than the width of the recess portions 511 such that the length of the smooth extension of the edges of the pixel electrode 40 may be larger. The width of the second groove 52 ("d3") may be configured accordingly. Basing on the above, the pixel structure of the groove structure 51 and the second groove 52 have not to be very precise.

In the embodiment, a liquid crystal panel includes the array substrate 100, a color-filter substrate 200 opposite to the array substrate 100, and a liquid crystal layer 300 between the array substrate 100 and the color-filter substrate 200.

Figure 9:
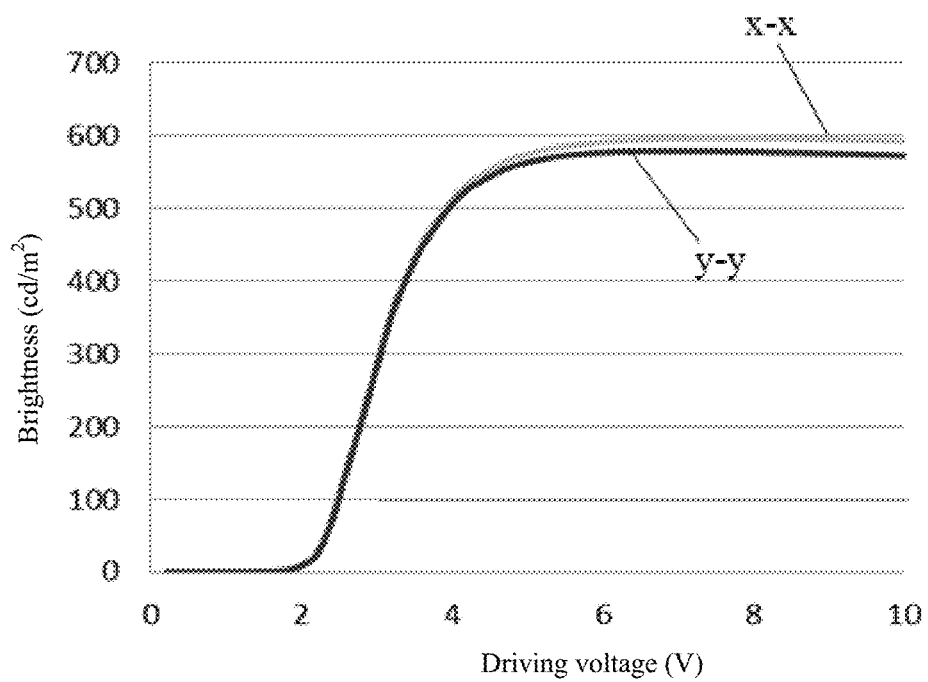
FIG. 9 is a curve diagram of the light transmission rate of the liquid crystal panel in accordance with one embodiment.

FIG. 9 is a curve diagram of the light transmission rate of the liquid crystal panel in accordance with one embodiment. The curve "x-x" relates to the liquid crystal panel adopting the above liquid crystal panel, and the curve "y-y" relates to the liquid crystal panel adopting the conventional liquid crystal panel. In view of FIG. 9, it can be understood that the light transmission rate of the liquid crystal panel of the claimed invention is enhanced.

It should be noted that the relational terms herein, such as "first" and "second", are used only for differentiating one entity or operation, from another entity or operation, which, however do not necessarily require or imply that there should be any real relationship or sequence. Moreover, the terms "comprise", "include" or any other variations thereof are meant to cover non-exclusive including, so that the process, method, article or device comprising a series of elements do not only comprise those elements, but also comprise other elements that are not explicitly listed or also comprise the inherent elements of the process, method, article or device. In the case that there are no more restrictions, an element qualified by the statement "comprises a . . . " does not exclude the presence of additional identical elements in the process, method, article or device that comprises the said element.

It is believed that the present embodiments and their advantages will be understood from the foregoing description, and it will be apparent that various changes may be made thereto without departing from the spirit and scope of the invention or sacrificing all of its material advantages, the examples hereinbefore described merely being preferred or exemplary embodiments of the invention.

What is claimed is:

1. An array substrate, comprising:
a plurality of pixel structures, each of the pixel structure comprising thin film transistor (TFTs) and a pixel electrodes on a glass substrate, a passivation layer being arranged between the TFT and the pixel electrode, the pixel electrode electrically connecting to the TFT via a through hole of the passivation layer, the passivation layer comprising a groove structure having a plurality of recess portions arranged periodically and at least one protrusion portion between every two adjacent recess portions, the passivation layer comprising a second groove surrounding a rim of the groove structure, the second groove connecting the plurality of the recess portions, the pixel electrode being substantially a surface covering the recess portions and the protrusion portions, and edges of the pixel electrode extending into the second groove.

2. The array substrate claimed in claim 1, wherein the through hole is configured at a center of the groove structure.

3. The array substrate claimed in claim 2, wherein the through hole is an original point of a X-axis and a Y-axis for dividing the groove structure into a first field, a second field, a third field, and a fourth field, the protrusion and the recess portions of the groove structure tilt with respect to the X-axis in the first field, the second field, the third field, and the fourth field, the recess portions and the protrusion portion of the first field and the second field are symmetric to the protrusion portion and the recess portions of the third field and the fourth field in view of the X-axis, and the recess portions and the protrusion portion of the first field and the groove structure fourth field are symmetric to the protrusion portion and the recess portions of the second field and the third field in view of the Y-axis.

4. The array substrate claimed in claim 3, wherein the protrusion portion and the recess portions of the first field tilt for 45 degrees with respect to the X-axis, the protrusion portion and the recess portions of the second field tilt for 135 degrees with respect to the X-axis, the protrusion portion and the recess portions of the third field tilt for −135 degrees with respect to the X-axis, and the protrusion portion and the recess portions of the fourth field tilt for −45 degrees with respect to the X-axis.

5. The array substrate claimed in claim 1, wherein a width of the recess portions and the protrusion portion are the same.

6. The array substrate claimed in claim 1, wherein a depth of the recess portions is smaller than the depth of the passivation layer.

7. The array substrate claimed in claim 6, wherein a width of the second groove and the recess portion are the same, and the width of the second groove is larger than the width of the recess portion.

8. The array substrate claimed in claim 1, wherein the pixel electrode is made by ITO.

9. The array substrate claimed in claim 1, wherein the passivation layer is made by $SiN_x$ or $SiO_x$.

10. A liquid crystal panel, comprising:
an array substrate, a color-filter substrate opposite to the array substrate, and a liquid crystal layer between the array substrate and the color-filter substrate, the array substrate comprising a plurality of pixel structures, each of the pixel structure comprising thin film transistor (TFTs) and a pixel electrodes on a glass substrate, a passivation layer being arranged between the TFT and the pixel electrode, the pixel electrode electrically connecting to the TFT via a through hole of the passivation layer, the passivation layer comprising a groove structure having a plurality of recess portions arranged periodically and at least one protrusion portion between every two adjacent recess portions, the passivation layer comprising a second groove surrounding a rim of the groove structure, the second groove connecting the plurality of the recess portions, the pixel electrode being substantially a surface covering the recess portions and the protrusion portions, and edges of the pixel electrode extending into the second groove.

11. The liquid crystal panel claimed in claim 10, wherein the through hole is configured at a center of the groove structure.

12. The liquid crystal panel claimed in claim 11, wherein the through hole is an original point of a X-axis and a Y-axis for dividing the groove structure into a first field, a second field, a third field, and a fourth field, the protrusion and the recess portions of the groove structure tilt with respect to the X-axis in the first field, the second field, the third field, and the fourth field, the recess portions and the protrusion portion of the first field and the second field are symmetric to the protrusion portion and the recess portions of the third field and the fourth field in view of the X-axis, and the recess portions and the protrusion portion of the first field and the groove structure fourth field are symmetric to the protrusion portion and the recess portions of the second field and the third field in view of the Y-axis.

13. The liquid crystal panel claimed in claim 12, wherein the protrusion portion and the recess portions of the first field tilt for 45 degrees with respect to the X-axis, the protrusion portion and the recess portions of the second field tilt for 135 degrees with respect to the X-axis, the protrusion portion and the recess portions of the third field tilt for −135 degrees with respect to the X-axis, and the protrusion portion and the recess portions of the fourth field tilt for −45 degrees with respect to the X-axis.

14. The liquid crystal panel claimed in claim 10, wherein a width of the recess portions and the protrusion portion are the same.

15. The liquid crystal panel claimed in claim 10, wherein a depth of the recess portions is smaller than the depth of the passivation layer.

16. The liquid crystal panel claimed in claim 15, wherein a width of the second groove and the recess portion are the same, and the width of the second groove is larger than the width of the recess portion.

17. The liquid crystal panel claimed in claim 10, wherein the pixel electrode is made by ITO.

18. The liquid crystal panel claimed in claim 10, wherein the passivation layer is made by $SiN_x$ or $SiO_x$.

* * * * *